Oct. 7, 1924.  
H. DIPPEL  
ELECTRIC EGG TESTER  
Filed May 16, 1922  
1,511,051  
2 Sheets—Sheet 1

Inventor  
Henry Dippel  
By Emery, Booth, Janney & Varney  
his Attorneys

Oct. 7, 1924.

H. DIPPEL 1,511,051

ELECTRIC EGG TESTER

Filed May 16, 1922

Inventor
Henry Dippel
By Emery, Booth, Janney & Varney
his Attorneys

Patented Oct. 7, 1924.

1,511,051

UNITED STATES PATENT OFFICE.

HENRY DIPPEL, OF SAN FRANCISCO, CALIFORNIA.

ELECTRIC EGG TESTER.

Application filed May 16, 1922. Serial No. 561,438.

*To all whom it may concern:*

Be it known that HENRY DIPPEL, a citizen of the United States, residing at San Francisco, in the county of San Francisco, State of California, has invented an Improvement in Electric Egg Testers, of which the following description, in connection with the accompanying drawings, is a specification, like characters on the drawings representing like parts.

My invention aims to provide improved apparatus by which large quantities of eggs may be quickly and accurately tested with a minimum of trouble on the part of the operator and with no danger of breakage. The invention has various other aims and advantages which will appear as this description is proceeded with.

In the accompanying drawings wherein I have shown one embodiment of my invention for purposes of illustration:—

Figure 1:
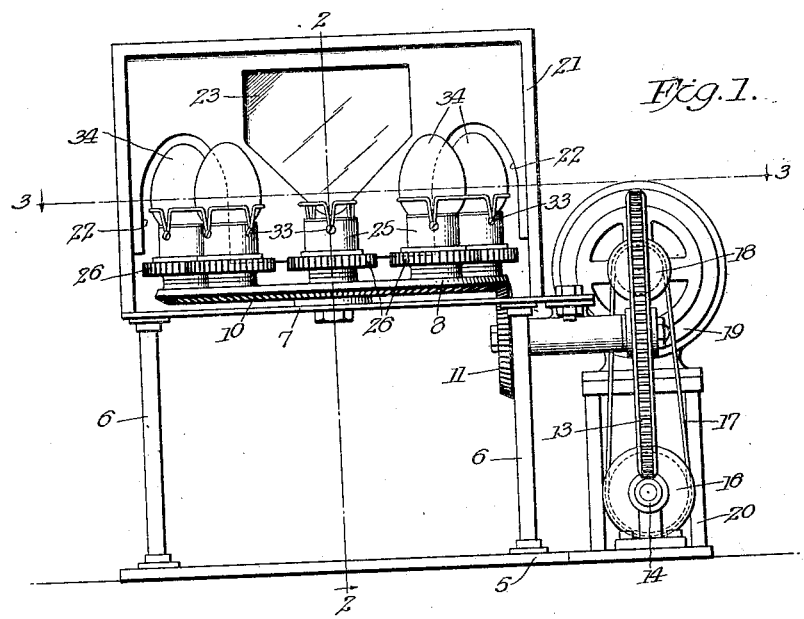
Fig. 1 shows in front elevation an egg candling device made in accordance with the invention.

In the particular embodiment of my invention selected for illustration herein and shown in the drawings, referring particularly to Fig. 1, there is employed a base 5 carrying posts or standards 6 which in turn support a plate 7, preferably rectangular in form. The plate 7 revolubly supports a turntable 8 by means of a pin 9, in my preferred construction. The turntable 8 is preferably a flat circular disk which is provided with bevel gear teeth 10 upon its periphery driven by a bevel pinion 11. The means by which the pinion 11 is rotated may assume various forms. The drawing shows the pinion 11 fast upon one end of a shaft 12 carrying at the other end a worm wheel 13 which is driven by a worm 14 on the shaft 15. The shaft 15 also mounts a pulley 16 which is rotated by a belt 17 from a motor pulley 18 on the shaft of an electric motor 19. Conveniently, the electric motor is mounted upon supports 20 on the base 5 so that the egg tester and its driving means form a portable unit. It will be understood that the turntable 8 may be rotated by any other convenient means or may be turned by hand.

Figure 2:
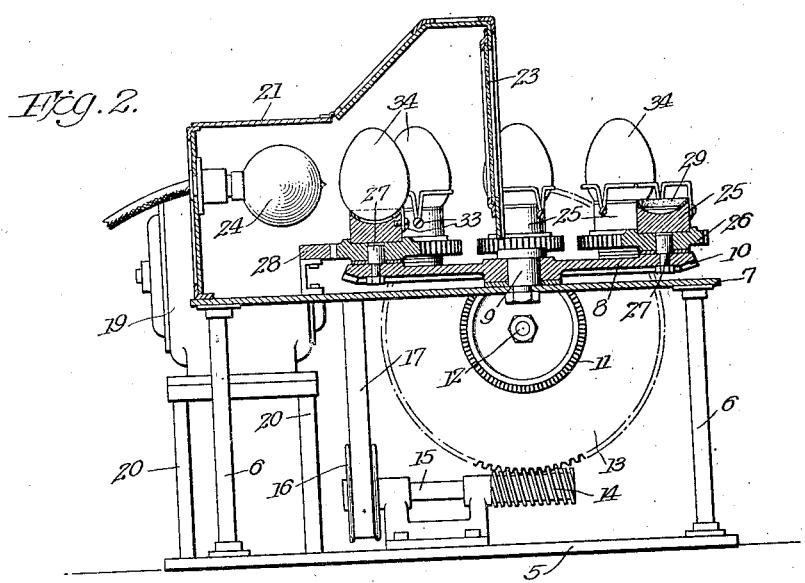
Fig. 2 is a vertical section on the line 2—2 of Fig. 1.
Figure 3:
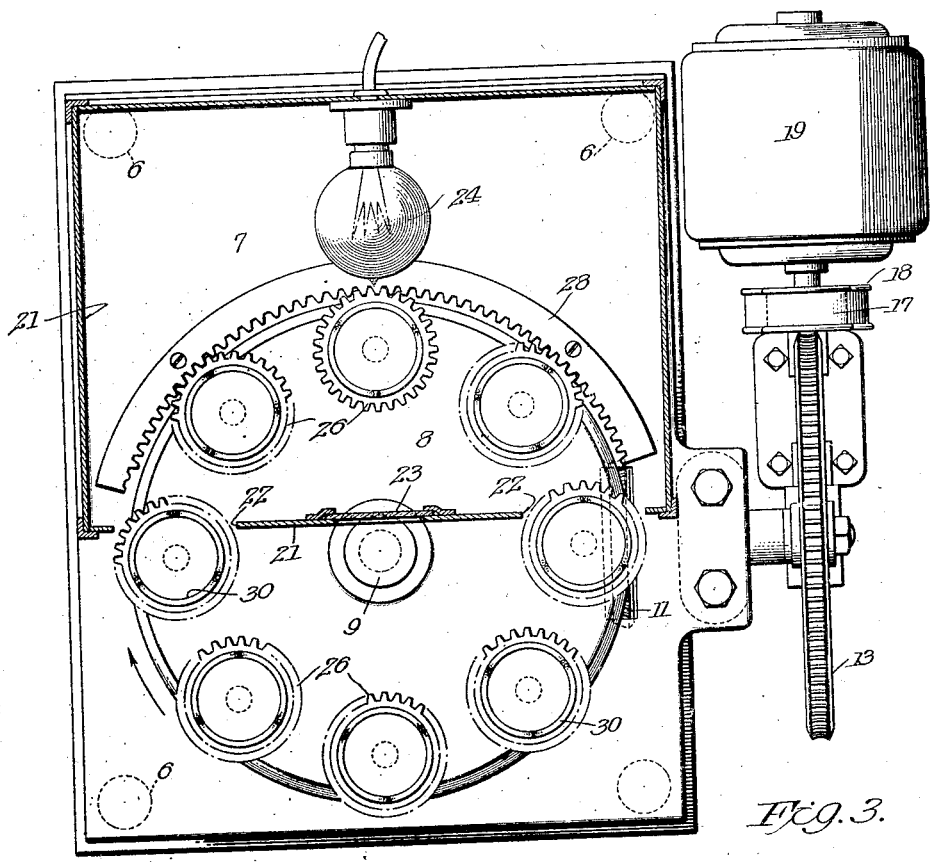
Fig. 3 is a horizontal section on the line 3—3 of Fig. 1.

Upon the plate 7 there is mounted a hood or cover 21 which may be hinged or otherwise held upon the plate so that it can be raised or even removed altogether. The hood 21 extends over the turntable 8 so that approximately one half of the turntable is within the hood when the latter is in position, as shown in Fig. 3, and the forward part of the hood preferably is higher than the rear part, as seen in Fig. 2. The hood provides a candling compartment or chamber and has entrance and exit openings 22 through which pass eggs supported on the turntable as the latter is rotated.

In the front wall of the hood 21 a pane of clear glass 23 is mounted so that the operator working from the front of the apparatus may see into the interior of the candling compartment. At the rear of the hood is a source of light preferably in the form of an electric lamp 24 of relatively low candle power. The window 23 is rectangular at the upper portion to permit a view from above into the compartment, but has a taper on the lower side, as shown in Fig. 1, whereby the person candling the eggs can restrict his vision of the interior of the candling compartment so that all the direct rays of light pass through the eggs. The window 23 is directly in front of the lamp 24 but is spaced therefrom, and the eggs carried upon the turntable come between the lamp and the window but much nearer the lamp than the window, whereby the operator observing the eggs from the outside of the hood can determine readily whether or not the eggs are in good condition.

It frequently happens that eggs which are to be candled are soiled but such eggs cannot be washed without causing them to spoil quickly. In candling such eggs, it is highly desirable that they be rotated while in front of the light so that the operator may obtain, where possible, an unobstructed view through the eggs from some angle and thus determine whether or not they are in good condition. If a soiled egg is passed in front of a light so that its soiled side is between the operator and the light, an erroneous idea of the condition of the egg may be obtained. The apparatus shown in the drawings, particularly in Figs. 2 and 3, is an example of a convenient means whereby each egg is turned on its axis as the turntable carries it around through the candling compartment. Preferably, there are eight egg supporting cups 25 each of which is removably held within a socket provided in a gear wheel 26 that is rotatable upon a vertical pin 27 fast to the turntable 8. An arcuate rack 28, best shown in Fig. 3, is supported upon plate 7 within the candling compartment and its teeth are so arranged that as the turntable rotates in the direction indicated by the arrow in Fig. 3, the teeth of the gear wheels 26 will mesh with the teeth of the rack immediately after each egg cup enters the candling compartment; and as the cups are carried around by the turntable, they will rotate preferably twice before emerging from the compartment.

By arranging the parts so that the egg cups rotate twice within the candling compartment, it comes to pass that each egg, at the moment when it is directly in front of the light, is in precisely the same angular position as when placed by the operator on the cup. In other words, when each egg reaches the half way point in its travel through the candling compartment, it has the same angular position that it had before it entered said compartment. Hence the operator may candle a soiled egg by placing the egg in a cup with its soiled face to either side (but not to the rear or front) with the assurance that when the egg is between him and the light, the light rays will pass directly through a clear part of the egg, the soiled face being to one side as originally placed. When the egg emerges from the compartment it will again be returned to its original position, which is a convenience.

Figure 4:
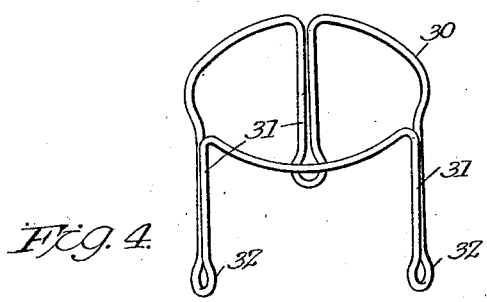
Fig. 4 is a perspective view of one of the wire guards.

The cups 25 are hollowed out on their upper sides to receive the ends of the eggs, as shown in Fig. 2, and around the rims of each cup 25 is a strip of plush 29 or other cushion, so that the eggs are supported upon a soft and yielding material. In order to prevent toppling over of the eggs with consequent breakage, there is provided a wire guard 30, best shown in Fig. 4, which may be made from a single piece of wire bent to form three legs 31 with loops 32 through which screws 33 may be passed to secure the guards upon the cups 25. The guards 30, being of resilient wire, may spring apart readily so as to adjust themselves to various shapes and sizes of eggs 34, and they are of open construction so as not to interfere with the candling of the eggs.

It is preferable to have the interior walls of the candling compartment painted black or covered with light absorbing material, so that the operator by working in a dim light, will not be disturbed by light reflected from the walls of the candling compartment and will be able to ascertain with certainty the condition of the eggs. The arrangement is such that by looking through the window 23 the light rays pass directly through the rotating eggs and any spots in the eggs become instantly apparent. The concave recesses on the upper side of the cups 25 are painted white so that the eggs may be placed upon their cups with certainty in the semi-darkness.

The operation of the egg tester is a simple matter. As soon as the motor 19 is started, the turntable commences to rotate, and as the egg cups move to the front of the tester, they are successively supplied with eggs to be candled. The eggs enter the candling compartment to the left as seen in Figs. 1 and 3 and come out of the compartment on the right. Each egg cup is supplied with a distinctive numeral or other symbol so that the operator can identify a bad egg after it emerges from the candling compartment. As rapidly as the eggs are candled, they are removed from the right side of the turntable and new eggs are placed upon the cups for testing.

The invention provides means whereby large quantities of eggs may be candled in a short space of time; the operator may use both hands, one hand to supply the cups with eggs and the other hand to dispose of the candled eggs according to their condition. A particular advantage of the device is that soiled eggs may be candled as accurately as perfectly clean eggs.

My invention obviously is not restricted to the particular embodiment thereof herein illustrated and described.

Having disclosed one illustrative embodiment of my invention without limiting myself thereto, what I claim as my invention and desire to secure by Letters Patent is:—

1. In an egg tester having a source of light within a compartment, an egg conveyor movable through said compartment to carry eggs past the source of light, and a plurality of egg supporting cups on the conveyor, the combination of a gear wheel supporting each cup, and a rack within the compartment adapted to engage with the teeth of the gear wheel as the conveyor moves the eggs into the compartment to rotate the eggs on their axes.

2. In an egg candling device having a candling compartment, a source of light in said compartment, a turntable adapted to carry eggs into and out of said compartment, and individual egg supporting cups mounted on the turntable, the combination therewith of means whereby each cup is rotated during its travel through the candling compartment so that the eggs are in their original angular position given them by the operator when he first puts them in their cups, at the instant they pass directly in front of the source of light.

3. In an egg candling device having a lighted compartment, a turntable for carrying eggs into and out of said compartment, and means on the turntable for supporting eggs in an upright position, the combination therewith of means within the compartment engageable with the egg supporting means whereby the eggs are rotated on their longitudinal axes only while passing through said compartment.

4. In an egg candling device having a source of light, a turntable rotatable near said source of light, and individual egg supporting devices carried upon the turntable and each adapted to support an egg in an upright position, the combination therewith of means whereby as the egg supports approach the source of light they are rotated to cause the eggs to turn on their longitudinal axes.

5. In an egg tester, the combination of means for conveying eggs toward and from a source of light, and means for rotating said eggs a predetermined distance on their axes so that each egg has the same angular position when nearest the light that it has when initially placed upon the conveyor whereby an unobstructed view through the eggs is obtainable by the operator whether the eggs be soiled or clean.

6. In an egg candling device having a source of light, and a turntable rotatable near said source of light, the combination therewith of individual egg supporting devices rotatably carried upon the turntable and each adapted to support an egg in an upright position, and means cooperatively engaging said supporting devices and adapted to rotate each egg supporting device on its axis during rotation of the turntable, whereby the angular position of each egg supporting device is the same when nearest the light as when the egg is initially placed therein, said latter means functioning irrespective of the direction of rotation of the turntable.

7. In an egg candling device, having a compartment and a light within the compartment, and a turntable for carrying eggs into and out of said compartment, the combination of carrier means rotatably mounted upon said turntable and each adapted to support an egg in upright position, and means for rotating said carrier means in timed relation to the movement of the turntable through the compartment and for a predetermined distance, so that each egg has the same angular position when adjacent the light that it has when initially placed upon the turntable.

In testimony whereof, I have signed my name to this specification.

HENRY DIPPEL.